Oct. 20, 1942.　　　R. B. P. CRAWFORD　　　2,299,531
AIR CONDITIONING SYSTEM
Filed Nov. 12, 1938　　　3 Sheets-Sheet 1

Inventor
Robert B. P. Crawford
By
George H. Fisher
Attorney

Inventor
Robert B. P. Crawford
By George H. Fisher
Attorney

Patented Oct. 20, 1942

2,299,531

UNITED STATES PATENT OFFICE 2,299,531

AIR CONDITIONING SYSTEM

Robert B. P. Crawford, Miami, Fla.

Application November 12, 1938, Serial No. 239,967

13 Claims. (Cl. 62—6)

This invention relates in general to air conditioning and more particularly to air conditioning systems adapted for automatic control.

It is an object of this invention to provide a combined heating and cooling air conditioning system which utilizes a refrigeration system araranged for reversal in operation and which utilizes a subterranean or other water supply for absorbing heat when the system operates on the cooling cycle and for supplying heat when the system operates on the heating cycle.

More specifically, it is an object of this invention to provide a system of the type mentioned, in which the water supply is used for precooling the air during the summer and for preheating the air during the winter, this action occurring before the water is supplied to the refrigeration system.

A further object of this invention is to provide a system of automatic control for an air conditioning system of the general type mentioned above, and which operates to maintain proper space conditions and also to reduce operating expenses to a minimum.

Another object of this invention is the provision of a combined heating and cooling system with a storage arrangement for storing either the hot or cold heat exchange medium, for thereby reducing the necessary size of the compressor.

Another object of this invention is the provision of an air conditioning system which includes a refrigeration system for both heating and cooling a space, and which is also arranged for providing a supply of domestic hot water both upon the heating and cooling cycles.

More specifically, it is an object to provide a system in which well or other cooling water is provided for cooling the condenser of a refrigeration system, with an arrangement for interrupting the supply of well water to the condenser and for utilizing the condenser for heating domestic hot water or other medium.

Another object is the provision of an automatic throttling arrangement for varying the flow of water through a condenser in a manner to maintain the heated water leaving the condenser at a desired value.

Other objects of this invention lie in various details and sub-combinations of the complete system and will become apparent from the following description and appended claims.

Figure 1:
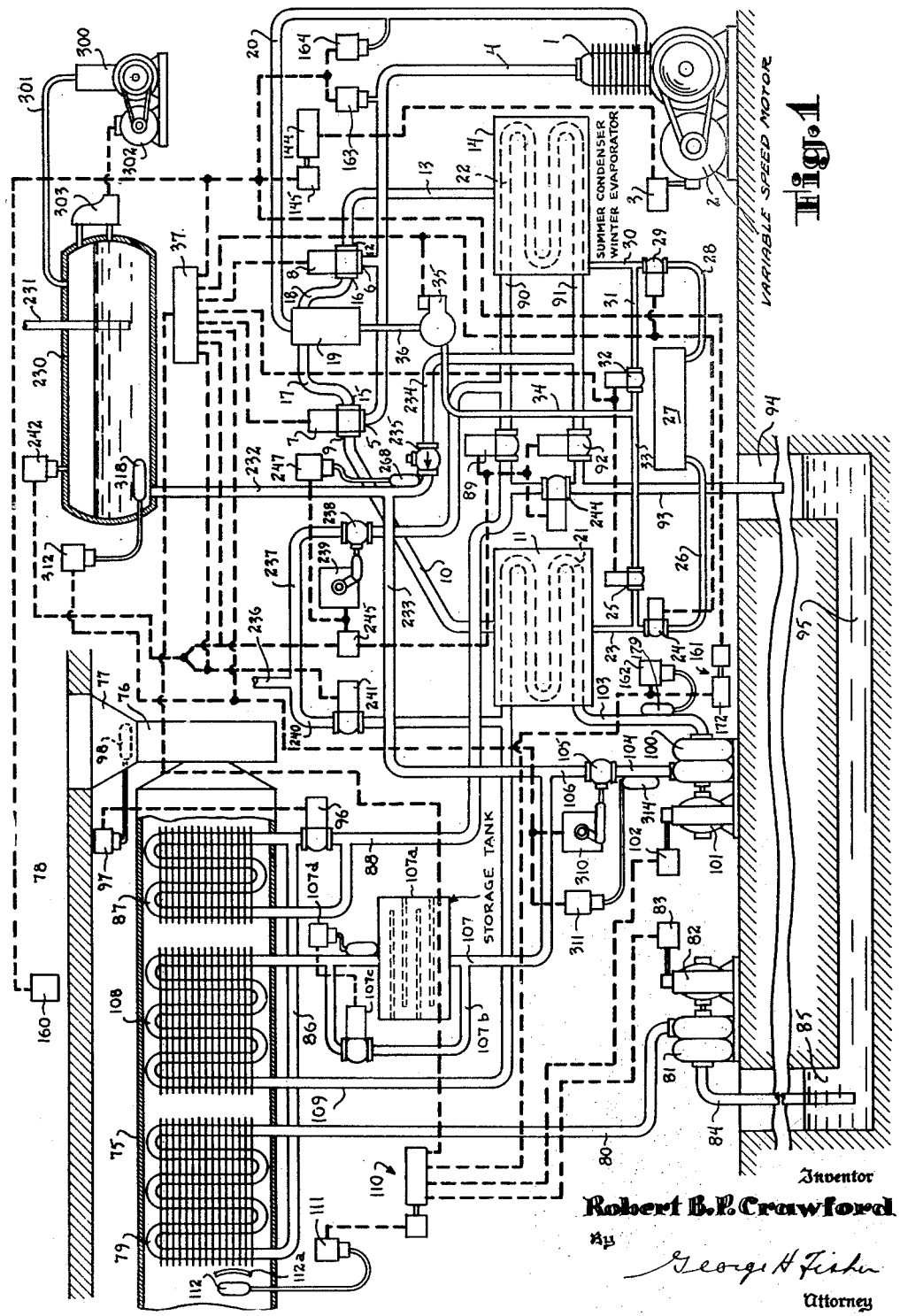
Figure 2:
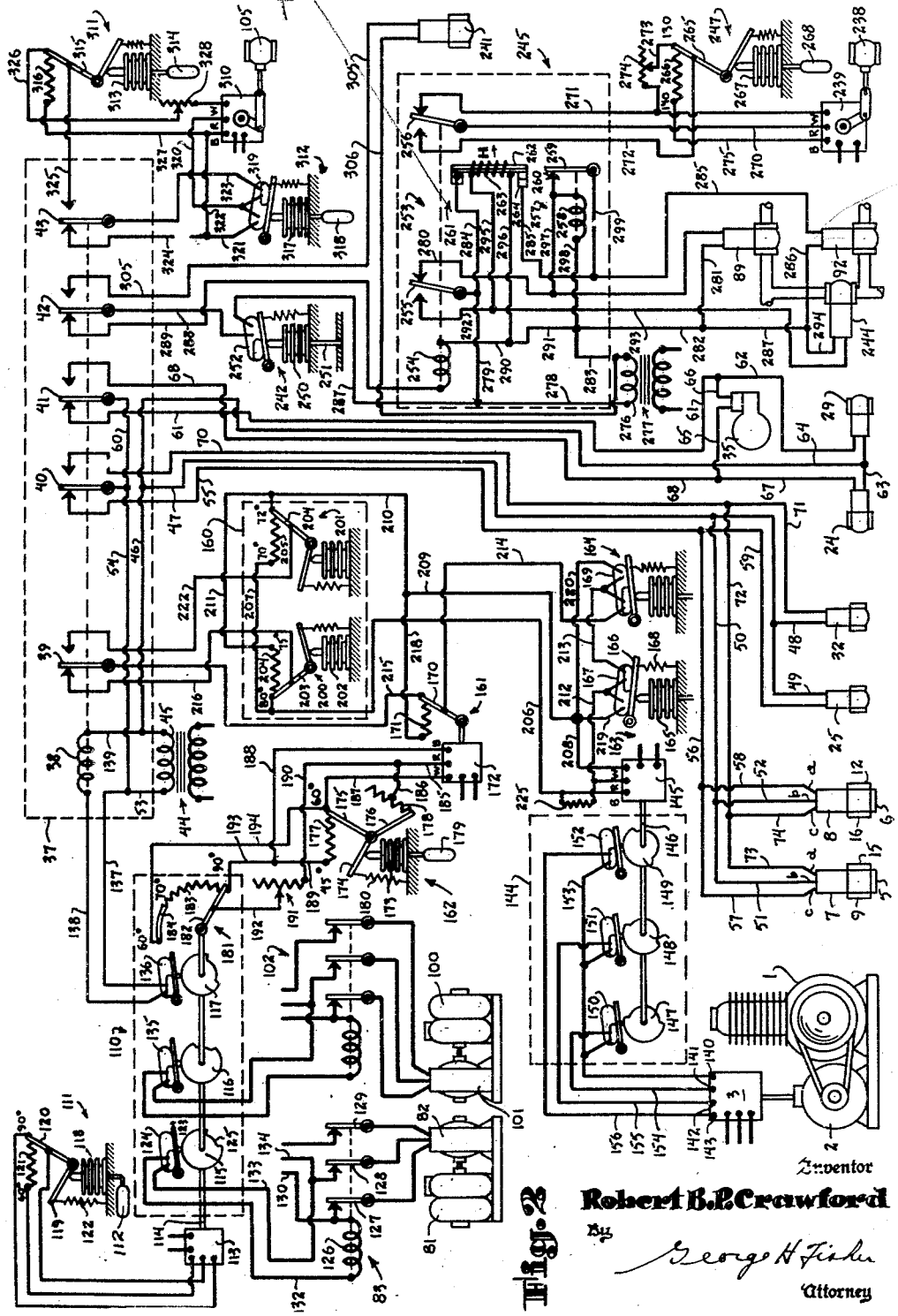
Figure 3:
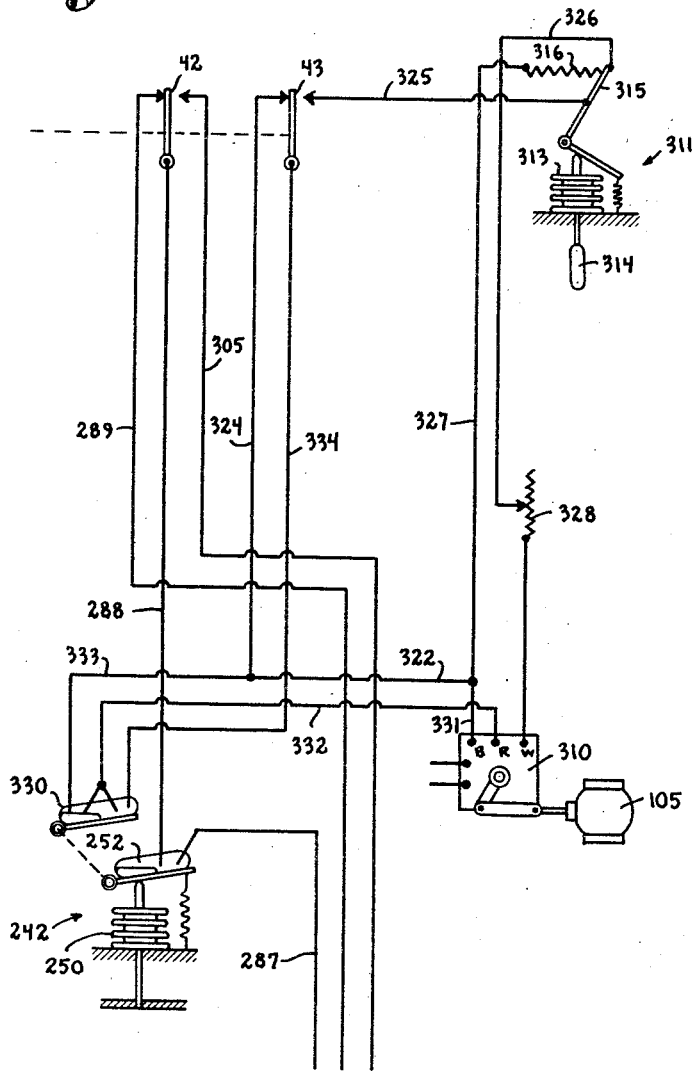

For a full disclosure of my invention, reference is made to the following detailed description and to the accompanying drawings, in which:

Figure 1 diagrammatically shows a combined heating, cooling and domestic hot water heating system embodying the principles of my invention, Figure 2 shows a wiring diagram for the controls utilized in controlling the system shown in Figure 1, and Figure 3 shows an alternate arrangement for a portion of the system shown in Figures 1 and 2.

Referring to Figure 1, reference character 1 indicates generally a compressor which may be driven by a variable speed electric motor 2 which is provided with a three-speed control box 3. Leading from the discharge connection of compressor 1 is a discharge line 4 which is connected to the bottom ports 5 and 6 of three-way valves 7 and 8 respectively. The left-hand port 9 of three-way valve 7 is connected by a pipe 10 to a heat exchanger 11 which acts as a condenser when the system is operating on the heating cycle and as an evaporator or water cooler when the system is operating on the cooling cycle. The right-hand port 12 of the three-way valve 8 is connected by a pipe 13 to a heat exchanger 14 which is adapted to act as a condenser for the cooling cycle and as an evaporator for the heating cycle. The right-hand port 15 of valve 7 and the left-hand port 16 of valve 8 are connected by pipes 17 and 18 to a trap 19, the upper end of which is connected by a suction line 20 to the inlet of the compressor 1.

The heat exchangers 11 and 14 are indicated diagrammatically as comprising casings enclosing coils 21 and 22 respectively. Leading from the casing of heat exchanger 11 is a pipe 23 which is joined to solenoid valves 24 and 25. The valve 24 is connected by pipe 26 to a receiver 27. The receiver 27 is also connected by a pipe 28 to a solenoid valve 29 which in turn is connected by a pipe 30 to the casing of heat exchanger 14. The pipe 30 is also connected by pipe 31 to a solenoid valve 32. Valves 25 and 32 are connected by pipe 33, which in turn is connected by pipe 34 to a float switch 35 which is located above the heat exchangers 11 and 14. This float switch is also connected to a drain pipe 36 which leads from the trap 19.

The valves 7, 8, 24, 25, 29 and 32 are controlled by means of a changeover relay indicated generally as 37. Referring now to Figure 2, this relay comprises a coil 38 which actuates through a suitable armature, not shown, switch arms 39, 40, 41, 42 and 43, each of which cooperates with "in" and "out" contacts as shown. When the coil 38 is energized, the various switch arms are brought into engagement with their respective "in" contacts and when the coil 38 is deenergized the switch arms are moved under the action of springs or gravity, not shown, into engagement with their respective "out" contacts. The relay 37 is controlled in a manner which will be hereinafter described for causing the switch arms to engage their "in" contacts when outside temperature is at or above 70°, and for causing the switch arms to engage their "out" contacts when outdoor temperature falls below 70°.

The three-way valves 7 and 8 are each provided with three terminals $a$, $b$ and $c$. These valves are arranged so as to place their lower ports into communication with their left-hand ports when power is supplied to terminals $a$ and $b$, while causing their left and right hand ports to be placed into communication when power is supplied through terminals $b$ and $c$. Valves of this general type are well-known in the art and no further description is necessary. The solenoid valves 24, 25, 29 and 32 are each of the type which opens when energized and which closes when deenergized.

The valves 7, 8, 25 and 32 are controlled by means of the switch arm 40 of relay 37. Referring now to the wiring connections, reference character 44 indicates a step-down transformer having a secondary 45. One side of this secondary 45 is connected by wires 46, 47, 48, 49, 50, 51 and 52 to the valves 7, 8, 25 and 32. The other terminal of transformer secondary 45 is connected by wires 53 and 54 to the switch arm 40. When the switch arm 40 engages its "in" contact, a circuit is completed from transformer secondary 53 through wire 54, switch arm 40, wire 55, wire 56 and wire 57 to terminal $c$ of the three-way valve 7 which causes this valve to assume a position for placing its ports 9 and 15 into communication. Also, at the same time a parallel circuit is completed from wire 56 to terminal $a$ of three-way valve 8 by wire 58, which causes this valve to assume a position in which its ports 6 and 12 are placed into communication. In addition, when the switch arm 40 engages its "in" contact another parallel circuit is completed from wire 55 through wire 59 to valve 25, which causes this valve to open.

The solenoid valves 24 and 29 are controlled by means of the float switch 35 and the switch arm 41 of relay 37. When the switch arm 41 engages its "in" contact a circuit is completed from transformer secondary 45, wire 53, wire 54, wire 60, switch arm 41, wire 61, wire 62 through valve 29, wire 63, wire 64 and wire 46 back to transformer secondary 45. This energization of the valve 29 causes this valve to remain open. The float switch 35 is connected by wire 66 to the junction of wires 61 and 62 and is also connected by wire 65 to the junction of wires 67 and 68, the wire 67 leading to valve 24 and wire 68 leading to the "out" contact cooperating with switch arm 41 of relay 37. When the refrigerant level within float switch 37 falls too low, this switch will close which will complete a circuit from wire 61 through wire 66, float switch 35 and wire 67 to valve 24 for causing this valve to open. However, when the liquid level within float switch 35 rises to a predetermined level, the switch 35 will open for breaking the energizing circuit to valve 24 thus permitting this valve to close.

Referring again to Figure 1, when the valves 7 and 8 are in the positions shown in Figure 2, compressed refrigerant will pass from the compressor through discharge line 4 into port 6 of three-way valve 8 and out through port 12 of this valve and through the pipe 13 to the heat exchanger 14 which, at this time, acts as a condenser for condensing the compressed refrigerant. At this time the valve 29 is continuously open as previously described, which permits the liquid refrigerant to flow through pipes 30 and 28 into the receiver 27 from which it flows through pipe 26 to the valve 24. This valve is at present under the control of the float switch 35 which is now connected so as to respond to the level of refrigerant within heat exchanger 11, due to valve 25 being open and valve 32 being closed. The float switch 35 will therefore control the valve 24 in a manner to maintain the predetermined refrigerant level. Evaporated refrigerant will now pass from the heat exchanger 11 through pipe 10 to the port 9 of three-way valve 7 and will leave this valve through port 15, passing through pipe 17 into the trap 19 and from this trap the refrigerant will pass through suction line 20 back to the compressor 1. Any liquid refrigerant which is carried over from heat exchanger 11 will be separated out in the trap 19 and will flow from this trap through the drain pipe 36 to the float switch 35 and from this switch through pipe 34 back into heat exchanger 11.

From the foregoing description it should be apparent that when the relay 37 is energized, the three-way valves 7 and 8 will be positioned for causing refrigerant to flow first through the heat exchanger 14, which acts as a condenser, and then through the heat exchanger 11 which acts as an evaporator or water cooler. At this time the valves 25 and 32 will be positioned for causing the float switch 35 to respond to the liquid level in heat exchanger 11 and this float switch will be placed into control of solenoid valve 24, the valve 29 being held wide open continuously at this time.

When the changeover relay 37 is deenergized for causing the system to operate on the heating cycle, the switch arms 40 and 41 will disengage their "in" contacts and engage their "out" contacts. Disengagement of switch arm 40 from its "in" contact will deenergize the solenoid valve 25 for causing this valve to close. Engagement of the switch arm 40 with its "out" contact will complete a circuit from transformer secondary 45 through wire 53, wire 54, switch arm 40, wire 70, and wire 71 to valve 32 for opening this valve. Also a parallel circuit will be completed from wire 70 through wires 72, 73 and 74 to terminal $a$ of valve 7 and terminal $c$ of valve 8 for causing valve 7 to assume a position placing its ports 5 and 9 into communication and for causing valve 8 to assume a position placing its ports 12 and 16 into communication.

Due to disengagement of switch arm 41 from its "in" contact, the continuous energization of valve 29 will be interrupted and due to engagement of this switch arm with its "out" contact a circuit will be completed for continuously energizing valve 24 as follows: transformer secondary 45, wire 53, wire 54, wire 60, switch arm 41, wire 68, wire 67, valve 24, wire 63, wire 64, and wire 46 to secondary 45. At this time the float switch 35 will be capable of energizing valve 29 by completing a parallel circuit from wire 68 through wires 65, 66 and 62 to valve 29. Thus when the relay 37 is deenergized, the valve 24 is held open continuously and valve 29 is placed under control of the float switch 35.

Referring again to Figure 1, with the valves in the positions just described due to relay 37 being deenergized, refrigerant will flow from the compressor 1 through discharge line 4 into valve 7 leaving this valve through port 9 and passing through pipe 10 into the heat exchanger 11, which will now act as a condenser. Liquid refrigerant will now pass through valve 24, which is continuously held open, into the receiver 27 and through the valve 29 which is now controlled by float switch 35, into the heat exchanger 14 which acts as an evaporator. At this time the valve 25 is closed and the valve 32 is open for causing the float switch 35 to respond to the level of the liquid refrigerant in heat exchanger 14. Evaporated refrigerant will now pass from heat exchanger 14 through pipe 13 to valve 8, leaving this valve through port 16 and passing through pipe 18 into the trap 19 from which it passes through suction line 20 to the compressor 1.

From the foregoing description it should now be obvious that when the relay 37 is energized the heat exchanger 14 will operate as a condenser and the heat exchanger 11 will operate as an evaporator. However, when the relay 37 is de-energized, the heat exchanger 11 will operate as a condenser and the heat exchanger 14 will operate as an evaporator.

Reference character 75 indicates an air conditioning chamber which may be supplied with fresh air or with a mixture of fresh air and return air withdrawn from the space being conditioned. The chamber 75 is connected to a fan 76 which draws air through the chamber 75 and discharges it through a discharge duct 77 into the space 78 being conditioned. Located in the chamber 75 is a heat exchange coil 79 which operates as a precooler for the air when the system is operated on the cooling cycle and as a preheater when the system operates on the heating cycle. The coil 79 is connected by a supply connection 80 to the discharge of a pump 81 which is driven by an electric motor 82 controlled by a starter 83. The pump 81 acts to draw water through a pipe 84 from a well 85. Thus when pump 81 is in operation, well water is passed into the coil 79 and passes from this coil through a pipe 86 which leads to the inlet of a reheater coil 87, and from this coil passes through pipe 88 to a valve 89 and through this valve and pipe 90 to the coil 22 in the heat exchanger 14. The water leaves this coil 22 through pipe 91 and passes through a valve 92 and pipe 93 to a sump 94 which may be connected by means of a subterranean ditch 95 with the well 85. During normal operation of the system on the cooling cycle, the water withdrawn from well 85 is cooler than the air supplied to conditioning chamber 75 and in passing through the heat exchanger 79 in counter-flow relation with the air, causes the air temperature to be reduced. Due to the counter-flow heat exchange relationship, the temperature of the water leaving coil 79 will be higher than the temperature of the air leaving this coil and consequently this water may be utilized for providing reheat if necessary. It will be noted that a by-pass valve 96 is provided around the reheater 87, this valve being controlled by a thermostat 97 the control bulb 98 of which is located in the discharge duct 77 so as to respond to the temperature of the air being discharged to the space 78. If the temperature of the discharged air falls below a predetermined value, the thermostat 97 will cause the valve 96 to be closed which forces the water through the reheater 87 before passing to the heat exchanger 14 for condensing the refrigerant. However, when the discharge air temperature is above the setting of thermostat 97, the valve 96 is caused to open for thus permitting the water to by-pass the reheater 87.

When the system is operating on the heating cycle, the temperature of the well water will be higher than the temperature of the air supplied to the conditioning chamber 75, which renders the well water available as a medium for preheating the air. At this time, due to operation of the system for heating, the temperature of the discharge air will be always above the setting of thermostat 97 which causes this thermostat to maintain valve 96 open. This permits the heating water to pass from the well through the coil 79 which acts as a preheater, directly to the heat exchanger 14, and from this heat exchanger to the sump 94. Therefore, during the heating cycle the coil 87 is always out of operation for preventing it from cooling down the heated air.

Reference character 100 indicates a circulating pump which is driven by means of an electric motor 101 having a starter 102. The inlet of this pump is connected by pipe 103 to the coil 21 in heat exchanger 11, and the discharge of this pump is connected by pipe 104 to a valve 105. The outlet of the valve 105 is connected by pipes 106 and 107 to the storage tank 107a which is in turn connected to coil 108 located in conditioning chamber 75. The coil 108 is adapted to act as a heater during the heating cycle and as a cooler during the cooling cycle. The storage tank 107a may also be provided with a by-pass 107b containing a solenoid valve 107c which is responsive to the temperature of the water leaving storage tank 107a. This valve 107c is controlled by a thermostat 107d, responsive to the temperature of the water leaving tank 107a. This thermostat controls the valve 107c in a manner to close this valve when the water leaving tank 107a is either sufficiently hot for heating, or sufficiently cool for cooling. Whenever the water temperature is at an intermediate value, the thermostat 107d will cause valve 107c to open for thus by-passing the water directly to the cooling coil 108. The outlet of coil 108 is connected by pipe 109 to the inlet of coil 21 in heat exchanger 11. It will be apparent that the pump 100 acts to circulate water or other heat exchange medium between the coil 21 in heat exchanger 11 and the coil 108 in conditioning chamber 75, the storage tank 107a providing for storage of hot or cold heat exchange medium. The heat exchanger 11, it will be remembered, operates as an evaporator or water cooler during the cooling cycle and as a condenser or water heater during the heating cycle. The arrangement just described, therefore, acts to cause cold water to be supplied to coil 108 when the system is operating for cooling and to supply hot water to this coil when the system is operating on the heating cycle.

From the description thus far, it should be apparent that coil 108 forms the primary heat exchange surface in conditioning chamber 75 and operates to cool the air in summer and to heat the air in winter due to the reversing arrangement of the refrigeration system, which causes the heat exchanger 11 to operate as a condenser in winter and as an evaporator in summer. It should also be apparent that the heat exchange coil 79 operates either as a precooler or as a preheater for the air being passed to the coil 108. Also it should be noted that the heat exchanger coil 79 acts to utilize the temperature difference between the well water and the air supplied to the conditioning chamber for providing either the precooling or reheating, and then supplies this water to the heat exchanger 14. Consequently, when the system operates on the cooling cycle the well water is utilized for precooling the air and then for cooling the condenser, thus making maximum use of this well water and increasing the system efficiency. Also, when the system operates on the heating cycle, the heat exchanger 14 acts as an evaporator and the well water in passing through this heat exchanger acts as a source of heat for the reversible cycle system.

Reference character 110 indicates generally a step controller which is controlled by means of a thermostat 111 which has its control bulb 112 located in any suitable manner so as to be responsive to outside temperature. This control bulb 112 is preferably provided with a shield 112a for preventing it from being affected by the coil 79. Referring to Figure 2, the step controller 110 comprises an electric proportioning motor 113 having an operating shaft 114 which actuates cams 115, 116 and 117. The proportioning motor 113 is preferably of the type shown in the Taylor Patent 2,028,110 and is adapted to be controlled by a potentiometer controller in a manner to cause its operating shaft to assume angular positions corresponding to the position of a potentiometer slider upon its resistance.

The thermostat 111 is a potentiometer type thermostat and may consist of a bellows 118 which is connected to the control bulb 112 for causing the pressure within this bellows to vary in accordance with outside temperature. The bellows 118 actuates a bell crank lever having an actuating arm 119 and a control arm 120 which cooperates with a resistance 121 to form a control potentiometer. The actuating arm 119 may be biased against the bellows 118 by a spring 122 as shown. This instrument may be so designed and adjusted as to cause the slider 120 to engage the left-hand end of resistance 121 when outdoor temperature falls to 60° F. or below, while causing the slider 120 to engage the right-hand end of resistance 121 when outdoor temperature rises to 90° F. or above.

With the thermostat parts in the position shown, the outdoor temperature is at or above 90° F. as indicated by the slider 120 engaging the right-hand end of resistance 121. This has caused the proportioning motor 113 to rotate its shaft 114 to its clockwise limit of rotation. Upon fall in outdoor temperature the slider 120 will begin moving to the left across resistance 121 and this movement will be followed up by corresponding counter-clockwise rotation of the motor shaft 114. Thus when outside temperature falls to 60° F. or below, the shaft 114 will assume its counter-clockwise limit of rotation.

The cam 115 actuates cam follower 123, which carries a mercury switch 124. This cam is provided with a recessed portion 125 which corresponds to 10° F. and the cam is mounted upon the shaft 114 in a manner to cause this recessed portion to engage the cam follower when outdoor temperature is between 60° F. and 70° F. By this arrangement, when outdoor temperature is between 60° F. and 70° F. the mercury switch 124 is tilted to open position. The mercury switch 124 controls the pump motor starter 83. This starter may be of usual form and is illustrated as comprising a coil 126 for actuating switch arms 127, 128 and 129 which are connected between a source of power and the pump motor 82. When the mercury switch 124 is closed, a circuit is completed from line wire 130 through coil 126, wire 132, mercury switch 124 and wire 133 to line wire 134, thus causing switch arms 127, 128 and 129 to engage their respective contacts for completing the power circuit to pump motor 82. When mercury switch 124 is open the energizing circuit for coil 126 will be broken, thus causing the switch arms to disengage their contacts for placing the pump out of operation. It should thus be apparent that the pump 81 will be in operation whenever outside temperature is below 60° F. or above 70° F. and will be out of operation when outside temperature is between these values.

The cam 116 actuates a cam follower carrying a mercury switch 135, which controls the pump starter 102 for the pump motor 101. The cam 116 is provided with a recessed portion corresponding to 10° F. of rotation of motor shaft 114, and is located on this shaft so that its recessed portion engages the cam follower when outside temperature is between 70° F. and 80° F. This arrangement causes the pump 100 to be in operation whenever outside temperature is below 70° F. or above 80° F. while placing this pump out of operation when outside temperature is between these values.

The cam 117 actuates a mercury switch 136 which is connected to control the changeover relay 37. The cam 117 is arranged to tilt mercury switch 136 to open position when outdoor temperature falls to 70° or below while causing this switch to be closed when outside temperature is above 70° F. When mercury switch 136 is closed, a circuit will be completed from transformer secondary 45, wire 53, wire 137, mercury switch 136, wire 138, relay coil 38 and wire 139 back to secondary 45. This will cause coil 38 to be energized for thus positioning the relay switch arms for placing the system on the cooling cycle. When the mercury switch 136 is open, the relay 37 will be deenergized for placing the system on the heating cycle.

From the above description it will be seen that the thermostat 111 operates through the step controller 110 in a manner to place the pump 81 out of operation when outdoor temperature is between 60° F. and 70° F., to place the pump 100 out of operation when outside temperature is between 70° F. and 80° F. and to position the changeover relay 37 for operating the system on the cooling cycle when outside temperature is above 70° F. and for operating the system on the heating cycle when outside temperature is below 70° F.

Referring now to the controls for compressor 1, the variable speed motor 2 therefor is provided with a speed control box 3 having a common control terminal 140, a high speed control terminal 141, an intermediate speed terminal 142 and a low speed terminal 143. This speed control box is controlled by means of a step controller generally indicated as 144. This step controller 144 may comprise a proportioning motor 145 which also may be of the type shown in the Taylor patent. This motor 145 is provided with an operating shaft 146 upon which are mounted cams 147, 148 and 149. The cam 147 actuates a mercury switch 150, the cam 148 actuates a mercury switch 151 and the cam 149 actuates a mercury switch 152. The cams 147, 148 and 149 are differentially adjusted on shaft 146 in a manner to cause the switches 150, 151 and 152 to close in sequence upon rotation of shaft 146 in a clockwise direction. Upon rotation of shaft 146 in the opposite direction the switches will be opened in inverse order.

The common terminal 140 of control box 3 is connected by wire 153 to each of the mercury switches. The low speed terminal 143 of this control box is connected by wire 156 to mercury switch 152. Consequently, when only switch 152 is closed the compressor will operate at low speed. The intermediate speed terminal 142 is connected by wire 155 to mercury switch 151, and the high speed terminal 141 is connected by wire 154 to mercury switch 152. By this arrangement, when shaft 145 is at its counter-clockwise limit of rotation the switches 150, 151 and 152 will all be open, which will cause the compressor 1 to be out of operation. As shaft 146 rotates in a clockwise direction the mercury switch 152 will first be closed for causing the compressor to operate at low speed. Upon further rotation of shaft 146 in the same direction, switch 151 will close for causing operation of the compressor at intermediate speed and upon still further rotation the switch 150 will close for operating the compressor at high speed. The arrangement just described, therefore, places the compressor out of operation or operates it at either low, intermediate or high speed depending upon the angular position of the motor shaft 146.

The proportioning motor 145 for the step controller 144 is controlled primarily by means of a space thermostatic device 160, and this thermostatic device is reversed in operation for summer and winter operation by means of the changeover relay 37. The proportioning motor 145 is also controlled by means of a limit controller 161 which may take the form of a step controller controlled by a thermostat 162 which is responsive to the temperature of the water leaving heat exchanger 11, this controller in turn being in effect adjusted by means of a potentiometer actuated by the step controller 110. The step controller motor 145 is additionally controlled by means of a high pressure cut-out 163 and a low pressure cut-out 164.

Referring to the high pressure cut-out 163, this controller may be of usual form and comprises a bellows 165 which is attached to the discharge line 4. This bellows actuates a switch carrier 166 carrying a double pole type mercury switch 167. The switch carrier 166 is biased against the action of bellows 165 by a spring 168. So long as the discharge pressure is not excessive, the spring 168 will maintain the switch carrier 166 in the position shown for bridging the right-hand electrodes of mercury switch 167. However, when the discharge pressure becomes excessive due to failure of cooling water supply to the condenser or for other reasons, the bellows 165 will expand against the action of spring 168 for unbridging the right-hand electrodes of switch 167 and bridging the left-hand electrodes thereof. The low pressure cut-out 164 may be of similar construction to the high pressure cut-out 163 but this controller is arranged to cause bridging of the left-hand electrodes of mercury switch 169 when the suction pressure is above a predetermined value. When, however, the suction pressure falls to the predetermined low value, the switch 169 will be tilted for bridging its right-hand electrodes.

The limit controller 161 consists of a potentiometer including a slider 170 and a resistance 171. The slider 170 is actuated by means of a proportioning motor 172 which may be of the type shown and described in the Taylor Patent 2,028,110. This proportioning motor 172 is controlled by the thermostat 162 which is responsive to the temperature of the water leaving the heat exchanger 11. This thermostat is diagrammatically illustrated as consisting of a bellows 173 which actuates a lever assembly including an actuating arm 174, a control arm or slider 175 and a corrector arm 176. The control arm 175 cooperates with a control resistance 176 to form a potentiometer controller, and the corrector arm 176 engages a center tapped resistance 178 for correcting the action of the controller. The bellows 173 is connected by a capillary tube to a control bulb 179 located on the pipe 103 (Figure 1). Upon a decrease in temperature of water leaving the heat exchanger 11, the pressure within bellows 173 will decrease thus permitting a biasing spring 180 to rotate the arms 175 and 176 in a counter-clockwise direction across their respective resistances, while upon an increase in temperature the arms 175 and 176 will be shifted in the opposite direction. This instrument may be so designed and adjusted as to cause the slider 175 to engage the right-hand end of resistance 177 when the water temperature is at 60° F. or above, while engaging the left-hand end of said resistance when the water temperature falls to 45° F.

The proportioning motor 172 is also controlled by means of a compensating potentiometer 181 which is actuated by the step controller 110. This compensating potentiometer consists of a slider 182 actuated by the shaft 114 and which cooperates with a resistance 183. This resistance is arranged with respect to the slider 182 in a manner to cause slider 182 to engage the lower end of said resistance when outside temperature is at 90° F. or above, while engaging the upper end of said resistance when outside temperature falls to 70° F. The resistance 183 at its upper end is attached to a contact segment 184 upon which the slider 182 rides when the outside temperature falls below 70° F.

Upon reference to the Taylor Patent 2,028,110, it will be found that the proportioning motor 172 is provided with three control terminals which in the drawings are marked R, W and B. This motor is adapted to assume intermediate positions within its range of rotation depending upon the relative values of resistance connected between terminals R and W and between terminals R and B. For instance, if equal values of resistance are connected across these terminals, the motor will assume intermediate positions at which the slider 170 engages the center of resistance 171. If the resistance between terminals R and W is decreased without corresponding decrease in resistance between terminals R and B, the motor will rotate in a direction for shifting slider 170 to the right across resistance 171. Also if the resistance between terminals R and B is decreased without corresponding decrease in resistance between terminals R and W, the motor 172 will rotate in a direction for shifting slider 170 to the left across resistance 171. Terminal R is connected by wires 185 and 186 to the resistance 178. As the sliders 175 and 176 are connected together, the slider 175 is therefore connected to terminal R. The terminal W of motor 172 is connected by wire 187 to the right-hand end of resistance 177 and terminal B of this motor is connected by wires 188 and 189 to the left-hand end of resistance 177. With the thermostat 162 in the position shown, the water temperature is at 60° F. or above as indicated by the slider 175 engaging the right-hand end of resistance 177. This places the entire resistance 177 between terminals R and B of motor 172 and completes a substantial short-circuit between terminals R and W of this motor. This degree of unbalancing of resistance between terminals R and B and R and W of motor 172 causes this motor to assume a position in which the slider 170 engages the right-hand end of resistance 171. Upon a decrease in temperature of the water leaving heat exchanger 11, the slider 175 will begin moving to the left across resistance 177 thereby inserting a portion of this resistance between terminals R and W and removing this same portion from the circuit between terminals R and B. This will cause the motor 172 to shift the slider 170 to the left across resistance 171 in proportion to the movement of the slider 175 on resistance 177.

The slider 182 of potentiometer 181 is connected to terminal R of motor 172 by wires 185, 190, rheostat 191 and wire 192. The lower end of resistance 183 is connected by wires 193 and 188 to terminal B of motor 172, and terminal W of this motor is connected to the upper end of resistance 183 by wires 187 and 194, and the contact segment 184. The potentiometer 181 is therefore connected in parallel with the potentiometer of thermostat 162 into the control circuit of the motor 172. When the outdoor temperature is at 90° or above, the slider 182 engages the lower end of resistance 183 which places the entire resistance 183 between terminals R and W of motor 172 and tends to short-circuit terminals R and B but for the action of the rheostat 191. This rheostat, however, limits the current flow through the slider 182 and thus causes the potentiometer 181 to have less effect upon the motor 172 than the potentiometer of thermostat 162. It will be noted that when outdoor temperature is at 90° or above, the tendency of potentiometer 181 is to short-circuit terminals R and B thus tending to cause motor 172 to shift slider 170 to the left across resistance 171. As the slider 182 moves upwardly across resistance 183 due to decreasing outside temperature, the portion of resistance 183 which is connected between terminals R and W is decreased and this portion is simultaneously placed into circuit between terminals R and B for tending to cause motor 172 to shift slider 170 to the right on resistance 171. It will thus be apparent that the action of the slider 181 upon falling outside temperature is opposite to the effect of thermostat 162 upon fall in cooling water temperature. The potentiometer 181 thus in effect acts to change the relationship between thermostat 162 and motor 172. In other words, as the outdoor temperature increases, the slider 175 of thermostat 162 must move further to the right to maintain slider 170 at the right-hand end of resistance 171. The potentiometer 181 therefore provides an adjustment for the thermostat 162 and acts to raise the control point of this thermostat upon increase in outside temperature and to lower the control point of this thermostat upon decrease in outside temperature. The specific control arrangement of motor 172 forms no part of this invention and for further details of this arrangement reference is made to the application of John E. Haines, Serial No. 38,946 filed September 3, 1935. The purpose of this adjustable limit controller 161 is to limit the minimum water temperature when the system is operating on the cooling cycle to prevent this water from being chilled more than necessary for cooling the space, thereby providing for operating the system at maximum economy. As the outside temperature increases, the control point of this limit controller is raised so as to cause the minimum cooling water temperature to rise upon increase in outside temperature.

The space thermostat 160 really comprises two separate thermostats 200 and 201. The thermostat 200 may include a bellows 202 which actuates a bell crank lever including a slider 203 which cooperates with a resistance 204 to form a control potentiometer. The thermostat 200 is for controlling the system when operating upon the cooling cycle, and this thermostat may be arranged to cause the slider 203 to engage the left-hand end of resistance 204 when the space temperature rises to 80° F. while causing the slider 203 to engage the right-hand end of resistance 204 when the space temperature falls to 75° F. The thermostat 201 is for controlling the system on the heating cycle and is arranged to operate reversely from the thermostat 200. This thermostat includes a slider 204 which cooperates with a resistance 205 and may be so designed and adjusted as to cause the slider 204 to engage the right-hand end of resistance 205 when space temperature is at or above 72° F. while engaging the left-hand end of this resistance when the space temperature falls to 70° F.

Referring now to the wiring between these controllers, it will be noted that terminal B of motor 145 is connected by wires 206 and 207 to the left-hand ends of resistances 204 and 205, and that terminal W of this motor is connected to the right-hand ends of these resistances by wires 208, 209, 210 and 211. Assuming now that the high and low pressure cut-outs 163 and 164 are in normal position, that the slider 170 of limit controller 161 is engaging the right-hand end of resistance 171, and that the changeover relay 37 is energized, terminal R will be connected to the slider 203 of thermostat 200 as follows: terminal R, wire 212, right-hand electrodes of mercury switch 167, wire 213, left-hand electrodes of mercury switch 169, wire 214, slider 170, wire 215, switch arm 39, and wire 216 to the slider 203. The space thermostat 200 is therefore in control of the proportioning motor 145. In the position shown, the space temperature is at 80° F., which has caused the slider 203 to engage the left-hand end of resistance 204 which places the entire resistance 204 between terminals R and W of motor 145 and substantially short-circuits terminals R and B. This has caused motor 145 to assume its extreme clockwise limit of rotation, which causes operation of the compressor 1 at full speed in the manner previously described. As the space temperature decreases, the slider 203 will shift to the right across resistance 204 and in response to this movement the motor 145 will rotate counter-clockwise, which will first tilt mercury switch 150 of step controller 144 to open position, thus decreasing the compressor speed from high speed to intermediate speed. Upon further decrease in space temperature, the thermostat 200 will cause the step controller motor 145 to rotate further in a counter-clockwise direction for decreasing the compressor speed. When the space temperature falls to 75° F. the proportioning motor 145 will assume its counter-clockwise limit of rotation for causing the compressor to be placed out of operation.

Te above description assumes that the compressor speed called for by the room thermostat is not sufficient to chill the water to the setting of the low limit controller 161. In the event that the cold water temperature falls below the setting of this limit controller, the slider 170 will be shifted to the left across resistance 171 in the manner previously described. This will insert a portion of resistance 71 into the circuit between terminal R and motor 145 and the slider 203 of thermostat 200, thus decreasing the effect of this thermostat upon motor 145. At this time it should be noted that the left-hand end of resistance 171 is connected by wires 218, 209 and 208 to terminal W of motor 145. Thus at the time that slider 170 engaged the right-hand end of resistance 171, this entire resistance was connected between terminals R and W. This shifting of the slider 170 to the left across resistance 171 thus in addition to inserting a portion of this resistance in circuit with the slider 203, also decreases the portion of this resistance in circuit between terminals R and W which causes rotation of this motor in a direction to decrease the compressor speed. The limit controller 161 therefore prevents the thermostat 200 from operating the compressor at a speed which will cool the water lower than necessary. As pointed out above, the control point of the limit controller is varied in accordance with outside temperature, thereby insuring that the cooling water temperature is raised in proportion to rise in outside temperature, thereby preventing an excessive and uneconomical temperature difference between the cooling water and the air being cooled.

In the event of the head pressure becoming excessive, the high pressure cut-out 163 will operate to unbridge the right-hand electrodes of mercury switch 167 and to bridge the left-hand electrodes thereof. This will complete a short-circuit through wires 212, 219 and 208 between terminals R and W of motor 145 for causing it to operate for placing the compressor out of operation. Similarly, if the suction pressure falls below a predetermined value the suction pressure controller 164 will operate to unbridge the left-hand electrodes of mercury switch 169 and to bridge the right-hand electrodes thereof, which will short-circuit terminals R and W of motor 145 as follows: terminal R, wire 212, right-hand electrodes of mercury switch 167, wire 213, right-hand electrodes of mercury switch 169, wire 220 and wire 208 to terminal W. Therefore, if either the high pressure rises too high or the suction pressure falls below a predetermined value the compressor will be placed out of operation.

When the relay 37 is deenergized for causing changeover of the system from the cooling cycle to the heating cycle, the switch arm 39 will disengage its "in" contact and engage its "out" contact. Disengagement of the switch arm 39 from its "in" contact will break the circuit between terminal R of motor 145 and slider 203 of thermostat 200, thereby placing this thermostat out of control of the compressor. Engagement of the switch arm 39 with its "out" contact will complete a circuit from terminal R of motor 145 to the slider 204 of thermostat 201 as follows: terminal R, wire 212, right-hand electrodes of mercury switch 167, wire 213, left-hand electrodes of mercury switch 169, wire 214, slider 170, wire 215, switch arm 39 and wire 222 to slider 204. The winter thermostat 201 will therefore be placed in control of the compressor and this thermostat will operate to increase the speed of the compressor upon fall in temperature and to decrease the compressor speed upon rise in temperature in a manner to maintain the space temperature between 70° F. and 72° F. At this time, the heat exchanger 11 will be operating to heat the water passing therethrough and consequently the temperature of this water will always be above the setting of limit controller 161, thus causing the slider 170 to remain engaged with the right-hand end of resistance 171. The limit controller 161 therefore does not affect the control of the compressor by the winter thermostat 201. It should be noted that a resistance 225 is connected between terminals B and R of motor 145. This resistance should be equal in value to resistance 171 and is provided for the purpose of balancing this resistance in the control circuit.

From the foregoing description it should be apparent that the control of the compressor speed controller is shifted from thermostat 200 to the thermostat 201 and vice versa by the changeover relay 37, and that the thermostat 201 acts to control the compressor during the cooling cycle while the thermostat 201 controls the compressor on the heating cycle. It also should be seen that the limit controller 161 will act to limit the minimum temperature of the cooling water during the cooling cycle and that this minimum or low limit temperature is determined in accordance with outside temperature. During the heating cycle this low limit controller is satisfied and consequently does not affect the control of the compressor by the winter thermostat 201. Also at any time if the discharge pressure rises too high or the suction pressure falls too low, the compressor will be placed out of operation.

This invention also contemplates the heating of domestic water by the air conditioning system both when it is in operation on the cooling cycle and on the heating cycle. This arrangement will now be described in detail. In Figure 1, reference character 230 indicates a storage tank for domestic hot water and this tank is provided with a discharge pipe 231 for conveying water to the points of use. This tank is provided with an inlet pipe 232 for conveying heated water thereto. This pipe 232 is connected to a pipe 233 which leads from the pipe 106 in the circulation circuit between heat exchanger 11 and coil 108. Pipe 232 is also connected to pipe 234 which leads from the pipe 91 at the outlet of coil 22 in heat exchanger 14. This pipe 234 is provided with a check valve 235. Reference character 236 indicates a pipe leading from a source of water such as a city water service line, and this pipe is connected to pipe 237 which is connected to the pipe 90 which leads to the coil 22. Interposed in pipe 237 is a motorized valve 238 including a proportioning motor 239. The pipe 236 is also connected by a pipe 240 to the pipe 109 which leads from coil 108 to the coil 21 in heat exchanger 11. This pipe 240 has interposed therein a solenoid valve 241. The valves 238 and 241 are controlled by means of the changeover relay 37 and a pressure controller 242 which is responsive to the pressure in tank 230. The valves 89 and 92 and the by-pass valve 244 are also controlled by relay 37 and the pressure controller 242 through a relay device 245. The valve 238 is additionally controlled by means of a thermostat 247 which is responsive to the temperature of the water flowing to tank 230 through the pipe 232.

Referring now to Figure 2, these controls will be described. The pressure controller 242 may be of usual form and consists of a bellows 250 which is connected by a tube 251 to the air space within tank 230. This bellows operates a mercury switch carrier carrying mercury switch 252 and is arranged to tilt this switch to open position when the pressure within tank 242 is at the desired value, while tilting this switch to closed position when the pressure falls to a predetermined lower value.

The relay device 245 contains a first relay 253 which consists of a relay coil 254 which operates through a suitable armature a pair of switch arms 255 and 256, each of which is provided with "in" and "out" contacts as shown. When coil 254 is energized the switch arms 255 and 256 engage their respective "in" contacts, and when coil 254 is deenergized these switch arms engage their "out" contacts. Also included within the relay device 245 is a second relay 257 having a coil 258 for operating through a suitable armature a switch arm 259 which cooperate with a contact 260. The device 245 also includes a thermo-electric timer generally indicated as 261. This timer includes a bimetallic element 262 which is arranged to be heated by means of an electric heating element 263. The element 262 is fixedly secured at its upper end and at its lower end carries a contact adapted to cooperate with a contact 264. When the element 263 is deenergized, the bimetallic element 262 will be cooled which will cause it to assume the position shown in which its contact is in engagement with contact 264. However, when the element 263 is energized, the bimetallic element will be slowly heated and after a predetermined interval of time, this element will warp to the right for disengaging from contact 264.

The thermostat 247 is of the potentiometer type and includes a slider 265 which cooperates with a resistance 266. The bellows 267 of this thermostat is connected by a capillary tube to the control bulb 268 which is located on pipe 234 so as to respond to the temperature of the heated water flowing from the coil 22 in heat exchanger 14 to the tank 230. This thermostat may be designed and adjusted in a manner to cause the slider 265 to engage the right-hand end of resistance 266 when the water temperature is at 130° F. or below, while engaging the left-hand end of said resistance when the water temperature rises to 140° F. The valve motor 239 for the valve 238 is of the proportioning type and is controlled by the thermostat 247 and by the switch arm 256 of relay 254. Terminal R of motor 239 is connected by wire 270 to the switch arm 256, and terminal W of this motor is connected by wire 271 to the "out" contact of relay 253. Thus when relay 253 is deenergized, terminals R and W of motor 239 are short-circuited for causing this motor to close valve 238 completely. When relay 253 is energized, the switch arm 256 engages its "in" contact which will complete a circuit from terminal R of motor 239 to the slider 265 of thermostat 47 as follows: terminal R, wire 270, switch arm 256 and wire 272 to slider 265. It will be noted that the right-hand end of resistance 266 is connected to terminal W of motor 239 by wire 273, rheostat 274 and wire 271, while the left-hand end of this resistance is connected to terminal B by wire 275. Thus when the relay 254 is energized, the valve 238 is placed under the control of thermostat 247. When the temperature of the delivered water is at 130° F. or below, the slider 265 engages the right-hand end of resistance 266 thus interposing the entire resistance 266 between terminals R and B of the motor, while substantially short-circuiting terminals R and W except for the resistance of the rheostat 274. Due to this resistance interposed in the circuit by rheostat 274, the valve 238 is prevented from closing entirely for thus providing a minimum flow of water through this valve. As the water temperature increases, the slider 265 moves to the left across resistance 266 thus opening valve 238 wider in proportion to the rise in water temperature. Therefore when the relay 253 is deenergized, the valve 238 is completely closed, while when this relay is energized, this valve is opened under the control of thermostat 247 and is modulated from a minimum open position to wide open position in accordance with the temperature of the water being delivered to the tank 230.

Due to the relay 37 being energized, the system is placed in condition for operating on the cooling cycle. At this time the relay 253 is deenergized which causes the valve 238 to be entirely closed. Due to the switch arm 255 engaging its "out" contact, the valve 89 is energized as follows: from secondary 276 of transformer 277, wire 278, wire 279, switch arm 255, wire 280, valve 89, wire 281, wire 282 and wire 283 to secondary 276. The valve 89 is therefore open. Also due to the thermo-electric timer contacts being closed, valve 92 is energized as follows: from transformer secondary 276, wire 278, wire 279, wire 284, element 262, contact 264, wire 285, valve 92, wire 289, wire 287, wire 282 and wire 283 to secondary 276. The valve 244 at this time is deenergized and therefore closed. Therefore, with the parts in the position shown the system is operating on the cooling cycle thus causing the heat exchanger 14 to act as a condenser for the refrigeration system. Also, the pressure within tank 230 is sufficiently high, which causes valves 238 and 244 to be closed while valves 89 and 92 are open. Water is therefore being pumped from the well 84, passing through the coil 79, pipe 88 and valve 89 to the coil 22 in heat exchanger 14, from which it flows through pipe 91, valve 92 and pipe 93 to the sump 94.

As hot water is withdrawn from the tank 230 the water level therein will fall, which causes the pressure in the air space above the water to reduce. When this pressure falls to a predetermined value, indicating that the supply of water in tank 230 requires replenishing, the mercury switch 252 of the pressure controller 242 will tilt to closed position. This will complete a circuit for energizing relay coil 254 as follows: transformer secondary 276, wire 278, wire 287, mercury switch 252, wire 288, switch arm 42, wire 289, relay coil 254, wire 290, wire 291 and wire 283 to secondary 276. Energization of relay 254 will cause switch arm 256 to disengage its "out" contact and engage its "in" contact for thus causing the valve 238 to open under the control of thermostat 247. Disengagement of the switch arm 255 from its "out" contact will break the energizing circuit for the valve 89, thus allowing this valve to close. This will prevent further flow of water from the coil 79 into the coil 22 of heat exchanger 14. At this time the valve 92 will remain energized by the same circuit as previously described and thus will remain open. Due to the switch arm 255 engaging its "in" contact, the valve 244 will be energized as follows: transformer secondary 276, wire 278, wire 279, switch arm 255, wire 292, wire 293, valve 244, wire 294, wire 287, wire 282 and wire 283 to secondary 276.

Therefore when the pressure controller 242 calls for replenishing of the water supply in tank 230, valve 238 is opened under the control of thermostat 247, valve 89 is closed, valve 244 is opened and valve 92 remains in open position. Due to the closing of valve 89 and opening of valve 244 the water leaving the coil 79 in conditioning chamber 75 flows directly to the sump 94 instead of through coil 22 to said sump. Due to opening of valve 238 water flows from the source of supply through pipe 236, pipe 237 and valve 238 to pipe 90, flowing through coil 22, pipe 91, valve 92 and pipe 93 to sump 94. Thus due to the valve 92 remaining open, city water is passed through the coil 22 for flushing out this coil and this flushing water passes into the sump 94.

At the same time that relay 253 is energized for changing the valve positions as above described, an energizing circuit for the heater 263 is completed through the "in" contact and switch arm 255 as follows: transformer secondary 276, wire 278, wire 279, switch arm 255, wire 292, wire 295, heating coil 263, wire 296, wire 291 and wire 283 to secondary 276. The thermo-electric timer will therefore begin heating and after a predetermined period this heating will become sufficient to cause the bimetallic element 262 to disengage its contact from contact 264 which will interrupt the energizing circuit for valve 92 thus permitting this valve to close. At this time the relay 257 is deenergized and consequently this relay will not complete an energizing circuit to the valve 92. It should therefore be seen that after a predetermined period of time following the opening of valves 238 and 294 and the closing of valve 89, the valve 92 will close. This closure of valve 92 will prevent further flow of water from the coil 22 to the sump 94. The water will therefore be forced from pipe 91 through the pipe 234, check valve 235 and pipe 232 into the tank 230. At this time the thermostat 247 will graduatingly control the valve 238 in a manner to maintain the temperature of the water passing to the tank above a predetermined value. For instance, if the temperature of the delivered water begins falling, the thermostat 247 will close valve 237 further, thereby reducing the rate of flow of water through heat exchanger 14 which permits this water to become more highly heated. Conversely, if the water temperature rises the thermostat 247 will cause opening of valve 238 for thus increasing the flow of water to thereby prevent the water from becoming overheated.

When the supply of water within tank 230 is replenished, the pressure controller 242 will deenergize the relay 253 for thus causing this relay to reassume the position shown in the drawings. Due to engagement of switch arm 256 with its "out" contact, the valve 238 will be completely closed in the manner previously described for preventing further supply of domestic water. Due to switch arm 255 disengaging its "in" contact, the by-pass valve 244 will be deenergized thus causing this valve to close. Also due to this same action, the heating element 263 of the timer 261 will be deenergized for thus permitting this timer to reassume the position shown in the drawings. Due to the switch arm 255 engaging its "out" contact the valve 89 will be opened by the circuit previously traced. Also due to this switch arm 255 engaging its "out" contact, the relay coil 258 of relay 257 will be energized as follows: transformer secondary 276, wire 278, wire 279, switch arm 255, wire 280, wire 297, relay coil 258, wire 298 and wire 283 to secondary 276. This will cause the switch arm 259 to engage contact 260 which will energize valve 92 as follows: transformer secondary 276, wire 278, wire 279, switch arm 255, wire 280, wire 297, contact 260, switch arm 259, wire 299, wire 285, valve 92, wire 286, wire 287, wire 282 and wire 283 to secondary 276. Therefore, when the pressure controller 252 indicates that the supply of water in tank 230 is replenished, valves 238 and 244 are closed and valves 89 and 92 are immediately opened for permitting the water flowing from coil 79 to flow through the heat exchanger 14 for thus condensing the refrigerant.

It should now be apparent that when the system is operating on the cooling cycle and the supply of water in tank 230 does not require replenishing, the valves 89 and 92 are open and valve 244 is closed for causing the water leaving the coil 79 in heat exchanger 75 to flow through the heat exchanger 14 and then into the sump 94. However, when the water supply requires replenishing the pressure controller 242 energizes the relay 253 of the relay device 245, which opens the valve 238 under the control of thermostat 247 for permitting domestic water to flow through the coil 22 of heat exchanger 14. Also at this time the valve 89 is closed for preventing water leaving coil 79 from passing through the coil 22, and valve 244 is opened for permitting this water to flow directly to the sump 94. For a predetermined period of time the valve 92 is retained open for thus permitting the incoming domestic water to flush out the coil 22 and the piping in order to insure that clean water is delivered to tank 230. After this timed flushing period the valve 92 is closed, which causes the water passing from coil 22 to flow into the tank 230 and the flow of water is controlled by the thermostat to maintain the temperature of the delivered water at the desired value. When the pressure controller 242 indicates that the supply of water within tank 230 is sufficient, this controller deenergizes the relay 253 in the relay device 254 which causes immediate closing of the valves 238 and 244 and opening of the valves 89 and 92 for thus restoring the system to normal cooling cycle operation.

Reference character 300 indicates an air compressor which is connected by a pipe 301 to the air space above the water in tank 230. This compressor is driven by an electric motor 302 which is controlled by a float switch 303 which is responsive to the level of the water in the tank 230. When this level rises to a predetermined high value the compressor 300 is placed into operation for forcing additional air into the tank 230. This arrangement provides for replenishing the air supply within the tank 230 and hence avoids any possibility of the tank becoming flooded due to loss of air from this tank by leakage or by becoming dissolved in the water. It should therefore be seen that the controllers 242 and 303 cooperate to maintain a predetermined amount of water within tank 230 at all times, the controller 242 acting to supply water to the tank in accordance with the pressure within the tank and the controller 303 acting to maintain a predetermined supply of air within the tank so as to render the controller 242 continuously operative.

When the system is operating on the heating cycle, the heat exchanger 14 operates as an evaporator and the heat exchanger 11 operates as a condenser. At this time, therefore, it is necessary to utilize the heat exchanger 11 for heating the domestic water supply. During the heating cycle the relay 37 is deenergized which thus causes the relay 253 of the relay device 245 to be deenergized. This in turn causes the valves 238 and 244 to remain closed and the valves 89 and 92 to remain open. Therefore, during the heating cycle the pressure controller 242 is completely disconnected from the relay device 245 and consequently during the entire heating cycle heat release or underground water will flow directly from the coil 79 through coil 22 of heat exchanger 14 to the sump 94. Due to the switch arm 42 of the changeover relay 37 now engaging its "out"

contact, the pressure controller 242 is placed in control of the solenoid valve 241 which controls the flow of domestic water to the inlet of coil 21 of heat exchanger 11. Now if the pressure within tank 230 falls below the setting of controller 242, the valve 241 will be energized as follows: transformer secondary 276, wire 278, wire 287, mercury switch 252, wire 288, switch arm 42, wire 305, valve 241 and wire 306 to transformer secondary 276. Water will now flow from pipe 236 through pipe 240 and valve 241 to the inlet of coil 21. The water will then flow through this coil and become heated, then flowing through pipe 103, pump 100, pipe 104, valve 105, pipe 106, pipe 233 and pipe 232 to the tank 230. Due to the action of check valve 235, this water will not flow into the pipe 234 and thus to the sump 94. When the water pressure within tank 230 is restored to the desired value, the controller 242 will deenergize the valve 241 which will prevent further flow of domestic water to the system.

The valve 105 is provided for the purpose of throttling the flow of water through the coil 21 to thereby maintain the temperature of the heated water at a value which is suitable for supply to the tank 230. This valve 105 is actuated by a proportioning motor 310 and this proportioning motor is controlled by means of a thermostat 311 which is responsive to the temperature of the water flowing from the coil 21. Motor 310 is also controlled by the changeover relay 37 and by a thermostat 312 which is responsive to the temperature of the water in tank 230.

The thermostat 311 is of the proportioning type and includes a bellows 313 which is connected by a capillary tube to a control bulb 314 located on pipe 104. This bellows 313 actuates a slider 315 which cooperates with a resistance 316 to form a control potentiometer. Upon an increase in temperature of the heated water, the slider 315 will move to the left across resistance 16 and upon a decrease in water temperature the slider will be shifted in the opposite direction. The thermostat 312 may consist of a bellows 317 which is connected by a capillary tube to a control bulb 318 located within tank 230. This bellows 317 actuates a mercury switch carrier carrying a mercury switch 319 in a manner to cause the right-hand electrodes of this thermostat to be bridged when the temperature within tank 230 is below a predetermined value, and to cause bridging of the left-hand electrodes of this switch when the storage water temperature is above such value.

Referring now to the wiring between valve motor 310, thermostats 311 and 312, and relay 37, it will be noted that terminal R of motor 310 is connected by wire 320 to the common electrodes of mercury switch 319, while the left-hand electrode of switch 319 is connected by wires 321 and 322 to terminal B of motor 310. By this arrangement, whenever the temperature of the water within tank 230 is above the setting of thermostat 312 a short-circuit is completed between terminals R and B of motor 310, which causes it to open valve 105 wide. The purpose of this arrangement is to avoid restricting the flow path for the circulating water whenever no heating is required for the water in tank 230. It should also be noted that the right-hand electrode of mercury switch 319 is connected by wire 323 to the switch arm 43 of relay 37, while the "in" contact of this relay is connected by wire 324 to the wire 322. By this arrangement, when the relay 37 is energized for placing the system on the cooling cycle, terminals R and B of motor 310 will be short-circuited as follows: terminal R, wire 320, right-hand electrodes of mercury switch 319, wire 323, switch arm 43, wire 324 and wire 322 to terminal B. This will cause the valve 105 to be opened wide whenever the system is operating on the cooling cycle. When the system is operating on the heating cycle and the thermostat 312 indicates that heating of the domestic water is desirable, the mercury switch 319 will be in the position shown and the switch arm 43 will engage its "out" contact. This will complete a circuit from terminal R of motor 310 to the slider 315 of thermostat 311 as follows: terminal R, wire 320, right-hand electrodes of switch 319, wire 323, switch arm 43 and wire 325 to slider 315. The right-hand end of resistance 316 is connected to terminal W of motor 310 by wire 326 and the left-hand end of this resistance is connected to terminal B by wire 327. Therefore, when the system operates on the heating cycle and heating of the domestic water is desirable, the thermostat 311 will be placed in control of the valve 105 for controlling this valve in a manner to maintain the desired temperature of the water leaving coil 21 of heat exchanger 11. It will be noted that a rheostat 328 is interposed in the circuit to terminal W of motor 310 for thus preventing valve 105 from being completely closed under the control of thermostat 311. This will insure a continuous circulation of water through the system for thus maintaining the thermostat 311 operative at all times and also insuring that the supply of heat to the coil 108 is never completely interrupted.

While I have shown the thermostat 312 for maintaining the valve 105 wide open whenever heat for domestic water is not required, it will also be understood that I contemplate substituting for this thermostat a pressure controller or in fact utilizing the pressure controller 242 in the control circuit of motor 310 in a manner to maintain the valve wide open whenever heated water is not being supplied to the tank 230

The schematic diagram shown in Figure 3 illustrates the manner in which the pressure controller 242 may be utilized to control the circuit of the motor 310 to maintain the valve 105 wide open whenever heated water is not being supplied to the tank 230. Referring to this diagram it will be noted that the pressure controller 242 operates the mercury switch 330 in addition to the mercury switch 252 as shown in Figure 2, and that this switch 330 is substituted for the mercury switch 319 of Figure 2 which is operated by the thermostat 312. The temperature controller 311 is connected to the motor 310 in the same manner as in Figure 2 and the mercury switch 252 in combination with the relay arm 42 functions in the same manner as in Figure 2. In Figure 3, however, the R terminal of the motor 310 is now connected by means of the wire 332 to the common electrode of the mercury switch 330. The left hand electrode of the mercury switch is connected by wires 333, 322, and 331 to the B terminal of the motor 310 and the right hand electrode of the mercury switch 330 is connected to the relay arm 43 of the change-over relay 37 by means of the wire 334.

Thus, if the change-over relay 37 should be energized to place the system on the cooling cycle, the terminals R and B of the motor 310 may be short circuited by means of a circuit extending from the R terminal of the motor 310 through the wire 332, right hand electrode of mercury switch 330, wire 334, relay arm 43, wire 324, 322 and 331 back to the B terminal of the motor 310. This will cause the motor 310 to move the valve 105 to wide open position. When the system is operating on the heating cycle and the pressure controller 242 indicates that heating of the domestic hot water is desirable, the mercury switch 330 will be in the position shown and the relay arm 43 will be in its out position because the change-over relay 37 will be deenergized at this time. This will complete a circuit from the R terminal of the motor 310 through wire 332, to the common terminal of the mercury switch 330 and then through the right hand terminal of the mercury switch 330, through wires 333, 322, and 331 back to the B terminal of the motor 310. Therefore, at this time the valve 105 will also be opened wide. If the mercury switch 330 should be in its other controlling position indicating that heating of the domestic hot water is not necessary the R terminal of the motor 310 will be connected by means of the wire 332 to the common terminal of the mercury switch 330 and then through the right hand terminal thereof through wire 334 to the relay arm 43 which will be in its out position and thence through conductor 325 to the slider 315 of the temperature controller 311. Under these conditions, therefore, the position of the valve 105 will depend upon the temperature at the temperature controller 311.

It will now be apparent that when the system operates on the heating cycle the pressure controller 242 is placed into control of the valve 241 and acts to open this valve whenever the supply of water within tank 230 requires replenishing. Also it should be apparent that the valve 105 acts under the control of thermostat 311 to maintain the temperature of the heated water at the desired value for domestic purposes and that this valve is caused to be wide open whenever heated domestic water is not required to be supplied to the tank 230. It will also be apparent that when the system is operating on the cooling cycle the valve 241 will remain closed and that the valve 105 will remain wide open.

Operation

With the parts in the positions shown, the outside temperature is at or above 90° F. as indicated by the slider 120 of the outdoor thermostat 111 engaging the right-hand end of resistance 121. This has caused the step controller motor 113 to rotate shaft 114 to its clockwise limit of rotation and this has caused closing of the mercury switches 124, 135 and 136. Due to closure of the mercury switches 124 and 135 the circulating pumps 81 and 100 are in operation. Also due to closure of the mercury switch 136 the changeover relay 37 is energized. Energization of this changeover relay, among other things, has caused positioning of the three-way refrigerant valves 7 and 8 in a manner to cause the heat exchanger 11 to operate as an evaporator for cooling the water and for causing the heat exchanger 14 to operate as a condenser. At this time the changeover relay 37 has placed the pressure controller 242 on tank 230 in control of the valve 238. Due to the pressure within tank 230 being above the setting of controller 242, this controller has deenergized the relay device 245 for thus causing the valves 238 and 244 to be closed while the valves 89 and 92 are open. Therefore, at this time water is withdrawn from the well 85 by pump 81, this water being passed through the coil 79 which acts as a precooler. The water leaving coil 79 then either flows through the reheater 87 or by-passes it, depending upon the temperature of the discharged air. If this temperature is above the setting of thermostat 97 the valve 96 will be open for thus permitting the reheater 87 to be by-passed, while if reheat is necessary the thermostat 97 will close valve 96 for forcing the water through reheater 87. The water flows from this point through the pipe 88 and the open valve 89 to the coil 22 in heat exchanger 14 for thus condensing the liquid refrigerant within the refrigeration system. From this point the water passes through pipe 91 and the open valve 92 through pipe 93 to the sump 94 from which it may return to the well 85 through the subterranean ditch 95 which causes this water to be cooled before returning to the well. At this time the heat exchanger 11 is operating as an evaporator or water cooler and the pump 100 circulates water from this heat exchanger through storage tank 107a to the coil 108 in conditioning chamber 75 for thus causing the coil 108 to act as a cooling coil for cooling the air being supplied to the space. Due to the system now operating on the cooling cycle, the valve 105 at the discharge of pump 100 is caused to be opened wide by the changeover relay 37.

With the system operating on the cooling cycle the changeover relay 37 places the space thermostat 200 in control of the step controller motor 145 which controls the compressor speed. With the parts in the position shown, the space temperature is at or above 80° F. as indicated by the slider 103 of thermostat 200 engaging the left-hand end of resistance 204. Also with the parts in the position shown, the temperature of the chilled cooling water is at 60° F. as indicated by the slider 175 of thermostat 162 engaging the right-hand end of resistance 177. This has caused the slider 170 to engage the right-hand end of resistance 171, in spite of the action of the potentiometer 181 which is actuated by the step controller 110. Due to the limit controller 161 now exerting no limiting effect and due to the fact that slider 203 of thermostat 200 is engaging the left-hand end of resistance 204, the step controller motor 145 has positioned its shaft 146 for causing the compressor to operate at maximum speed. The space thermostat 200 will now control the compressor speed in a manner to decrease the compressor speed upon temperature fall and to increase the compressor speed upon temperature rise, thereby maintaining the space temperature within the range of the thermostat 200. However, the limit controller 161 will prevent the thermostat 200 from operating the compressor sufficiently to reduce the cooling water temperature below a predetermined value, and this value is varied by the action of the potentiometer 181 in a manner to raise the limit control point upon rise in outside temperature and vice versa. This action of the limit controller 161 prevents the water temperature from being cooled further than necessary for maintaining the desired space temperature and thus avoids uneconomical operation of the system which might occur if the space thermostat alone controlled the compressor.

As water is withdrawn from the tank 230 and the water level reaches the low limit value, the pressure controller 242 will energize the relay device 245 which acts to open valve 238 under the control of thermostat 247 and to close valve 89 while opening valve 244 and maintaining the valve 92 open temporarily. This action in the manner previously described causes the well water to be by-passed around the coil 22 in heat exchanger 14 and also permits flushing out of this coil by city water entering through pipe 237 and leaving the coil through the open valve 92. Then after a predetermined flushing period the relay device 245 closes valve 92 which causes the water passing from coil 22 to flow through pipe 234, check valve 235 and pipe 232 into the tank 230. When the water level within tank 230 is raised to the desired point the pressure controller 242 deenergizes the relay device 245, which causes closing of valves 239 and 244 and opening of valves 89 and 92 for returning the system to normal operation.

As outside temperature falls, the slider 120 of thermostat 111 will begin moving to the left across resistance 121, which will cause counterclockwise rotation of the shaft 114 thus causing slider 182 of potentiometer 181 to shift upwardly along resistance 183, which has the effect of lowering the control point of the limit controller 161 to thus permit the chilled water temperature to be lowered correspondingly. This action is necessary in order to insure that the desired differential in temperature between the chilled water and outside air may be maintained for securing the necessary transfer of heat from the air to the cooling water. Due to falling of outside temperature, the cooling load upon the system will decrease, which permits the space temperature to fall and in response to such falling space temperature the thermostat 200 will reduce the compressor speed to thus prevent overcooling of the space. When the outside temperature falls to 80° F. the cam 116 of step controller 110 will cause tilting of mercury switch 135 to open position which will stop the pump 100. This will prevent further circulation of cold water between the heat exchanger 11 and the coil 108. This stopping of the cooling water circulation will stop further supply of heat to the evaporator or water cooler 11 thus stopping the evaporation of liquid refrigerant within this device. Due to this action the compressor 1 will eventually reduce the pressure within evaporator 11 and the suction side of the system as to cause the suction pressure controller 164 to operate for stopping the compressor. It will therefore be seen that when the outside temperature falls to 80° F. the circulating pump 100 is stopped, which results in stopping of the compressor 1. This is desirable as when the outside temperature is below 80° F. the cooling effect of the coil 79 will be sufficient for cooling the space sufficiently, unless the outdoor air is nearly saturated.

When outside temperature falls to 70° F., the mercury switch 136 of step controller 110 will be tripped for deenergizing the changeover relay 37. Deenergization of this relay will cause repositioning of the refrigerant valves 7 and 8 as well as the other refrigeration system valves for causing reversal in operation of the refrigeration system, thus causing the heat exchanger 11 to operate as a condenser and to cause heat exchanger 14 to operate as an evaporator. The changeover relay will also place the compressor controlling step controller 144 under the control of the winter thermostat 201 which now acts to increase the compressor speed upon falling in space temperature and to decrease the compressor speed upon rise in space temperature in a manner to maintain the space temperature between 70° F. and 72° F. Deenergization of the changeover relay 37 will also act to place the pressure controller 242 in control of the water valve 241 and to place the valve 105 under the control of the thermostats 311 and 312.

With the system in operation on the heating cycle, water is withdrawn from well 85 by pump 81 and passed through the coil 79 in conditioning chamber 75. This coil now acts as a preheater for heating the cold incoming air with the relatively warm well water. Due to coil 108 acting as a heating coil, the discharge air thermostat 97 will be satisfied thus maintaining the valve 96 open for permitting the water leaving coil 79 to by-pass the summer reheater 87. The water leaving the coil 79 will therefore flow through pipe 88, open valve 89 and pipe 90 into coil 22 of heat exchanger 14 which operates as an evaporator for absorbing heat from this water. This chilled water then flows through pipe 91 and valve 92 into the sump 94 from which it flows back to the well 85 through subterranean ditch 95 which now acts to heat the water.

As mentioned above, the heat exchanger 11 operates as a condenser during the heating cycle for thus supplying heated water to the coil 108. Due to the valve 241 now being under the control of the pressure controller 242, this valve will be opened whenever the water level in tank 230 falls to the low limit point. This will permit water to flow from the supply pipe 236 through pipe 240 into coil 21 of heat exchanger 11, passing through pipe 103, pump 100, valve 105, pipe 106, pipe 233 and pipe 232 into the tank 230. At this time the position of the valve 105 is controlled by the thermostat 311 to throttle the flow of water in a manner to maintain the heated water temperature at the desired value. However, when the temperature of the water within tank 230 is above the setting of thermostat 312 this valve will be maintained wide open for thereby avoiding unnecessary restriction in water flow when heated domestic water is not required.

When the outside temperature is between 70° and 60° F. the cam 115 of the step controller 110 will cause opening of switch 124 for placing the pump 81 out of operation. At this time very little or no heat will be required for heating the space and in fact the cold well water will be cooler than the air passing through the conditioner 75. It is thus desirable to stop flow of well water through the coil 79 at such times for this would tend to cool the air passing to the space.

In most installations, the internal heat gain within the space will be sufficient to maintain the space temperature above the control point of the winter thermostat 201 until the outside temperature is well below 60° F., and consequently the compressor will not be placed into operation when the pump 81 is out of operation. Consequently, no provision is illustrated for starting pump 81 when compressor 1 is placed into operation. For unusual applications of my invention in which the internal heat gain for the space is low, it may be desirable to provide for starting pump 81 when the compressor is started, in order to provide a source of heat for heat exchanger 14 which is then acting as an evaporator. This may readily be accomplished by a switch on step controller 144, which is connected in parallel with switch 124, or by a relay in parallel with switch 124 which is energized simultaneously with the compressor.

Due to the action of the storage tank 107a, heated water will be stored for heating the space when the system operates on the heating cycle, and cold water will be stored when the system operates on the cooling cycle. Due to this storage effect, the necessary compressor capacity will be reduced. In the event that the stored medium is not satisfactory for either cooling or heating, the valve 107c will be opened for permitting a portion of the medium to flow directly to heat exchanger 108, and this valve will remain open until the temperature of the medium leaving the tank is returned to a suitable value.

From the foregoing description it will be seen that I have provided a reversible cycle refrigeration system for cooling a conditioned space in summer and for heating the space during the winter. It will also be seen that during both the heating cycle and the cooling cycle the system will automatically heat domestic hot water. It will further be seen that my improved system utilizes a well or other source of water supply for absorbing heat removed from the space on the cooling cycle and for supplying heat to the space on the heating cycle.

While throughout this description I have mentioned different values of temperature and pressures at which the various controls may operate, it will be understood that these values are illustrative only and will vary for different installations and applications of my improved system. While I have shown and described a preferred form, it will be apparent that many modifications which are within the scope of my invention will occur to those skilled in the art. I therefore desire to be limited only by the scope of the appended claims.

I claim as my invention:

1. In a system of the class described, in combination, a refrigeration system having an evaporator and a condenser, means for conditioning a space including a precooling device and a cooling device, means for passing a cooling medium through said precooling device and then in heat exchange relationship with said condenser, means for passing a heat exchange medium in heat exchange relationship with said evaporator and then through said cooling device, means for varying the output of said refrigeration system in accordance with the cooling load on the system, and thermostatic limit control means responsive to the temperature of the heat exchange medium passing to said cooling device for additionally controlling said refrigeration system.

2. In a system of the class described, in combination, a refrigeration system having an evaporator and a condenser, means for conditioning a space including a cooling device connected to said evaporator for receiving cooling medium therefrom, means for varying the output of said refrigeration system in accordance with the cooling load, limit control means responsive to the temperature of the cooling medium passing to said cooling device for controlling said refrigeration system, and outside temperature responsive means for adjusting said limit control means.

3. In a system of the class described, first and second heat exchangers for either heating or cooling a space to be conditioned, said first heat exchanger being arranged to operate either as a preheater or a precooler, and said second heat exchanger being arranged to operate either as a heater or as a cooler, a refrigeration system including a first heat exchange device, a second heat exchange device, and reversing control means for selectively causing said first heat exchange device to operate as an evaporator while said second heat exchange device operates as a condenser, or for causing said first heat exchange device to operate as a condenser while said second heat exchange device operates as an evaporator, means for passing a heat exchange medium through said first heat exchanger and then into heat exchange relationship with said first heat exchange device, means for placing said second heat exchanger and said second heat exchange device into heat exchange relationship, a tank for storing heated medium, said tank being connected to the outlets of both heat exchange devices, a source of medium to be heated, and means for connecting said source to the first heat exchange device during the cooling season, and to the second heat exchange device during the heating season.

4. In a system of the class described, first and second heat exchangers for either heating or cooling a space to be conditioned, said first heat exchanger being arranged to operate either as a preheater or a precooler, and said second heat exchanger being arranged to operate either as a heater or as a cooler, a refrigeration system including a first heat exchange device, a second heat exchange device, and reversing control means for selectively causing said first heat exchange device to operate as an evaporator while said second heat exchange device operates as a condenser, or for causing said first heat exchange device to operate as a condenser while said second heat exchange device operates as an evaporator, means for passing a heat exchange medium through said first heat exchanger and then into heat exchange relationship with said first heat exchange device, means for placing said second heat exchanger and said second heat exchange device into heat exchange relationship, a tank for storing heated medium, said tank being connected to the outlets of both heat exchange devices, a source of medium to be heated, means for connecting said source to the first heat exchange device during the cooling season, and to the second heat exchange device during the heating season, and thermostatic valve means for controlling the flow of medium through said heat exchange devices when each is acting as a condenser in a manner to maintain the temperature of the heated medium above a predetermined value.

5. In a system of the class described, in combination, a refrigeration system for cooling a space to be conditioned, said refrigeration system including a condenser, a precooler for cooling said space, means for passing cooling medium through said precooler and then into heat exchange relationship with said condenser, a storage tank for domestic hot water, a source of water to be heated, and means responsive to a demand for hot water in said tank for interrupting the flow of cooling medium in heat exchange relationship with said condenser and for passing said medium to be heated in heat exchange relationship with said condenser.

6. In a system of the class described, in combination, a refrigeration system for conditioning a space, said refrigeration system including a condenser, a tank for storing a heated medium, means for passing medium to be heated in heat exchange relationship with said condenser for cooling said condenser and heating said medium, means for passing the heated medium to said tank, flow control means for controlling the flow of said medium, and means responsive to the temperature of the stored heating medium and to the temperature of the heated medium flowing to said tank for controlling said flow control means.

7. In a system of the class described, in combination, a refrigeration system for cooling a space to be conditioned, said refrigeration system including a condenser, means for passing cooling medium through said condenser for cooling said condenser, a tank for storing heated medium, a source of medium to be heated, means actuated upon demand for heated medium to interrupt the flow of cooling medium in heat exchange relationship with said condenser, and to pass medium from said source in heat exchange relationship with said condenser, valve means for permitting a flushing action by said medium, and timing means for causing said valve means to be operated after a predetermined flushing period to cause said heated medium to flow to said tank.

8. In a system of the class described, in combination, a refrigeration system for conditioning a space, said refrigeration system including a condenser, a tank for storing a heated liquid, said tank being closed at its upper part for trapping a gas above the liquid therein, means for passing said liquid in heat exchange relationship with said condenser and into said tank, flow control means for controlling the flow of said liquid in heat exchange relationship with said condenser, means responsive to the temperature of the heated liquid for controlling said flow control means, means responsive to the pressure in said tank for controlling the flow of liquid thereunto, means for forcing gas into said tank, and means responsive to the liquid level in said tank for controlling said forcing means.

9. In a combined heating and cooling system, in combination, heat exchange means for either heating or cooling air in a space, a reversible refrigeration system for selectively supplying hot or cold heat exchange medium to said heat exchange means, a storage tank for the heat exchange medium interposed between said heat exchange means and said refrigeration system, a by-pass around said storage tank, a valve in said by-pass, and means responsive to the temperature of the medium in said tank for controlling said valve.

10. An apparatus for supplying water for both heat exchange and domestic use, said apparatus comprising a heat exchanger, a line for supplying water thereto, a modulating valve in said line, thermostatic means for automatically controlling said modulating valve in accordance with the demands made upon said heat exchanger to vary the rate of flow of water therethrough from the supply line, a line from the outlet of said heat exchanger connecting with a domestic water supply system, and valved means operated in response to pressure in the apparatus to relieve the apparatus of water flowing through the heat exchanger in excess of domestic requirements while maintaining in said domestic system a supply of water under adequate pressure, the last mentioned means being connected to the second mentioned line at a point between said heat exchanger and said domestic water supply system.

11. In a system of the class described, in combination, a refrigeration system for conditioning a space, said refrigeration system including a condenser, a tank for storing a heated medium, means for passing medium to be heated in heat exchange relationship with said condenser for cooling said condenser and heating said medium, means responsive to a demand for heated medium in said tank for causing a flow of said heated medium to said tank, flow control means for controlling the flow of said medium in heat exchange relationship with said condenser, and means responsive to the temperature of the heated medium for controlling said flow control means in a manner to restrict the flow upon fall in temperature to thereby maintain the temperature of the heated medium at a predetermined value, said demand responsive means operating when the demand for heated medium in said tank is satisfied to prevent the further delivery of heated medium to said tank and also to maintain said flow control means in maximum flow condition irrespective of said temperature responsive means.

12. In an air conditioning system for a space, first and second heat exchangers, means forcibly circulating a medium through said first exchanger, said medium having a substantially constant temperature slightly lower than the desired temperature of said space whereby said first heat exchanger acts as a precooler in summer and a preheater in winter, means forcibly circulating a medium through said second heat exchanger, means for heating said last named medium for winter operation, refrigeration means for cooling said last named medium for summer operation, and means responsive to outside temperature for rendering said heating or cooling means effective depending upon whether said temperature is below or above a predetermined intermediate value, said outside temperature responsive means including means for stopping circulation of said medium through said second heat exchanger when said outside temperature is within a range between said intermediate value and a higher value during which said precooler is sufficient to maintain the temperature in said space at a desired value.

13. In an air conditioning system for a space, first and second heat exchangers, means forcibly circulating a medium through said first exchanger, said medium having a substantially constant temperature slightly lower than the desired temperature of said space whereby said first heat exchanger acts as a precooler in summer and a preheater in winter, means forcibly circulating a medium through said second heat exchanger, means for heating said last named medium for winter operation, refrigeration means for cooling said last named medium for summer operation, and means responsive to outside temperature for rendering said heating or cooling means effective depending upon whether said temperature is below or above a predetermined intermediate value, said outside temperature responsive means including means for stopping circulation of said medium through said second heat exchanger when said outside temperature is within a range between said intermediate value and a higher value during which said precooler is sufficient to maintain the temperature in said space at a desired value, said outside temperature responsive means also including means for stopping the circulation of medium through said first heat exchanger when said outside temperature is between said intermediate value and a predetermined lower value at which time no artificial heating is required to maintain the desired temperature within said space.

ROBERT B. P. CRAWFORD.